(12) United States Patent
Anderton et al.

(10) Patent No.: US 10,842,129 B1
(45) Date of Patent: Nov. 24, 2020

(54) INVISIBLE PET FENCING SYSTEMS AND METHODS

(71) Applicants: Terry Anderton, Hampton Falls, NH (US); Samuel Stoddard, Somersworth, NH (US)

(72) Inventors: Terry Anderton, Hampton Falls, NH (US); Samuel Stoddard, Somersworth, NH (US)

(73) Assignee: WAGZ, Inc., Portsmouth, NH (US)

( * ) Notice: Subject to any disclaimer, the term of this patent is extended or adjusted under 35 U.S.C. 154(b) by 0 days.

(21) Appl. No.: 16/889,114

(22) Filed: Jun. 1, 2020

Related U.S. Application Data

(60) Provisional application No. 62/854,369, filed on May 30, 2019.

(51) Int. Cl.
| | | |
|---|---|---|
| *A01K 15/02* | (2006.01) |
| *H04W 4/021* | (2018.01) |
| *H04W 4/029* | (2018.01) |
| *H04W 36/00* | (2009.01) |
| *A01K 27/00* | (2006.01) |
| *H04B 17/318* | (2015.01) |

(52) U.S. Cl.
CPC .......... *A01K 15/023* (2013.01); *A01K 27/001* (2013.01); *A01K 27/009* (2013.01); *H04B 17/318* (2015.01); *H04W 4/021* (2013.01); *H04W 4/029* (2018.02); *H04W 36/00* (2013.01)

(58) Field of Classification Search
CPC .... A01K 15/023; H04W 4/029; H04W 4/021; H04W 28/0226; H04W 36/00
USPC ........................................................ 340/573.3
See application file for complete search history.

(56) References Cited

U.S. PATENT DOCUMENTS

| | | | | |
|---|---|---|---|---|
| 7,602,302 | B2 * | 10/2009 | Hokuf .................. | A01K 11/008 340/539.13 |
| 8,498,618 | B2 * | 7/2013 | Ben Ayed ............. | G06F 21/572 455/411 |
| 8,783,212 | B2 * | 7/2014 | Bellon ................. | A01K 27/009 119/720 |
| 9,055,475 | B2 * | 6/2015 | Lacatus ............. | H04W 52/0261 |
| 9,774,995 | B2 * | 9/2017 | So ....................... | G08B 21/0272 |
| 10,602,244 | B2 * | 3/2020 | Struhsaker ............ | A61B 5/1113 |

* cited by examiner

*Primary Examiner* — John A Tweel, Jr.
(74) *Attorney, Agent, or Firm* — Ascentage Patent Law, LLC; Travis Lee Johnson

(57) ABSTRACT

A system and a method for locating an animal in area no matter what type of communications that are present where the animal is located utilizing a smart collar. The smart collar communicates via different type of signals and a system and method are used to operate the smart collar in the most efficient mode in order to prolong the operating life of smart collar battery.

14 Claims, 13 Drawing Sheets

INVISIBLE PET FENCING SYSTEMS AND METHODS

PRIORITY CLAIM

This application claims the benefit of U.S. provisional patent application No. 62/854,369, being filed on May 30, 2019, which is hereby incorporated by reference in its entirety.

FIELD OF THE INVENTION

The present invention relates generally to tracking animals, such as pets, using a smart collar system.

BACKGROUND OF THE INVENTION

Pet collars have long been used to provide identification information regarding the home or owner location of pets, particularly when lost. Collars are also often used as an attachment means for leashes or other retention mechanisms for walking etc. Collars have also been used more recently as a vehicle for providing transceivers for global positioning and geolocation (GPS) usable for providing the real-time location of a pet, a particular use for when the pet is lost or otherwise wanders away from a specified area.

One problem with a collar having GPS capabilities, is that the collar is powered by battery and that has a limited amount of power to supply the collar. Another problem with such a collar is that in an area with limited GPS signals, such as a heavily wooded area, the collar is either unable to locate the animal at all, or uses an increased amount of power to locate the animal, causing the battery to drain quickly. One of the objectives of the present application is to improve upon battery life, range and flexibility of a tracking collar or invisible fencing system.

SUMMARY OF THE INVENTION

It is desirable to have a system and a method for locating an animal in an area no matter what type of communications that are present where the animal is located. Furthermore, it is desirable to have a smart collar that communicates via different types of signals and to operate in the most efficient mode in order to prolong the operating life of the smart collar battery. Accordingly, the present application relates to systems and methods for a pet locating system that defines communication plans for geographic regions or zones.

In some embodiments, a method for creating a geofence and extending battery life of a smart collar includes creating a geofenced area larger than a user's residence. A listing of available public hotspots, cellular strength regions, and global positioning system (GPS) regions for the geofenced area, is determined for the created geofence area. A communication plan is generated based on a given position for an animal wearing the smart collar residing in the geofenced area. At least a portion of the communication plan is uploaded to the smart collar's memory.

In at least one embodiment the communications plan is modified on a remote server based on the current direction the animal wearing the animal collar is heading.

In at least one embodiment the communications plan involves switching between operating in a Cellular or GPS communication mode to operating in a public hotspot mode.

In at least one embodiment creating a geofenced area comprises determining a most efficient technique for tracking the smart collar based on a geographic region where the smart collar is currently located. The most efficient technique for tracking the smart collar is based on an amount of energy consumed by the smart collar.

In some embodiments a method for creating a geofence and extending battery life of a smart collar includes placing a device in a first region and determining a presence and strength of GPS signals, cellular signals, and public WIFI signals. The signals present and strength for each signal is stored and a type of communication that is most efficient for a smart collar is determined based on the stored signal data. A communication plan is saved for the first region. In at least one embodiment, these steps are repeated for one or more additional regions and the most efficient method of communication is determined for each region.

In at least one embodiment, a system for creating a geofence and extending battery life of a smart collar includes a device configured to determine a location and presence and strength of GPS signals, cellular signals, and public WIFI signals. The system also includes a processor configured to determine which type of communication is most efficient for a smart collar at the location and a memory device configured to store which type of communication is most efficient.

In some embodiments a method of extending battery life of smart collar includes using a networked computing device having a processor and a memory to: identify an area for desired use of the smart collar, gather GPS signal data for the area from a remote database, gather cellular signal data for the area from a remote database, gather public WIFI signal data for the area from a remote database, and generate an extended battery plan for uploading to a smart collar. A smart collar is used to: determine a presence and strength of GPS signals, cellular signals, and public WIFI signals in the identified area based on the uploaded extended battery plan, and record signal strength data of GPS signals, cellular signals, and public WIFI signals in the identified area. The recorded signal strength data is sent to a memory accessible to the networked computing device. The recorded signal strength data is compared to the signal data from the remote database for GPS signal data, cellular signal data and public WIFI signal data. The extended battery plan is updated based on the compared signal information and the updated extended battery plan is uploaded to the smart collar.

In at least one embodiment the remote database is updated with the recorded GPS signal data, cellular signal data, and public WIFI signal data.

In at least embodiment a geofence is created around at least a portion of the identified area.

In at least one embodiment, the smart collar is configured to notify a user associated with the smart collar when the smart collar has gone outside the geofence area.

In at least embodiment the smart collar is configured to cause a stimulus device on the smart collar to be activated.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Contemplated herein is an improved pet training and location system which can be utilized by a pet owner to train a pet to behave in a certain manner depending on the pet's particular location as determined by a collar being worn by the pet. In particular, the pet can be trained to stay in particular permitted areas and not enter restricted areas, while operating the smart collar in a manner that increases battery life. In some instances, the restricted and permitted areas can be statically located, such as in a yard, which is a permitted zone, as opposed to outside the yard, in a garden plot, or a flower bed, which can be defined as restricted zones. Or alternatively the permitted areas can be mobile, such as a certain distance from a user, like when walking with the pet, wherein the pet is only allowed to travel a certain maximum distance from the user.

In some instances, particularly when beginning training, it can be advantageous to provide negative stimulation, or negative reinforcement to discourage a pet from leaving the permitted zone and entering one or more restricted zones. However, in some instances, once a restricted zone has already been entered it can be important to cease providing negative reinforcement, and instead provide a positive stimulus or reinforcement to encourage the pet to return to the permitted zone. Additionally, in some instances, use of negative stimulus can be omitted altogether, and positive reinforcement used as the sole mechanism for location-based training.

Figure 1:
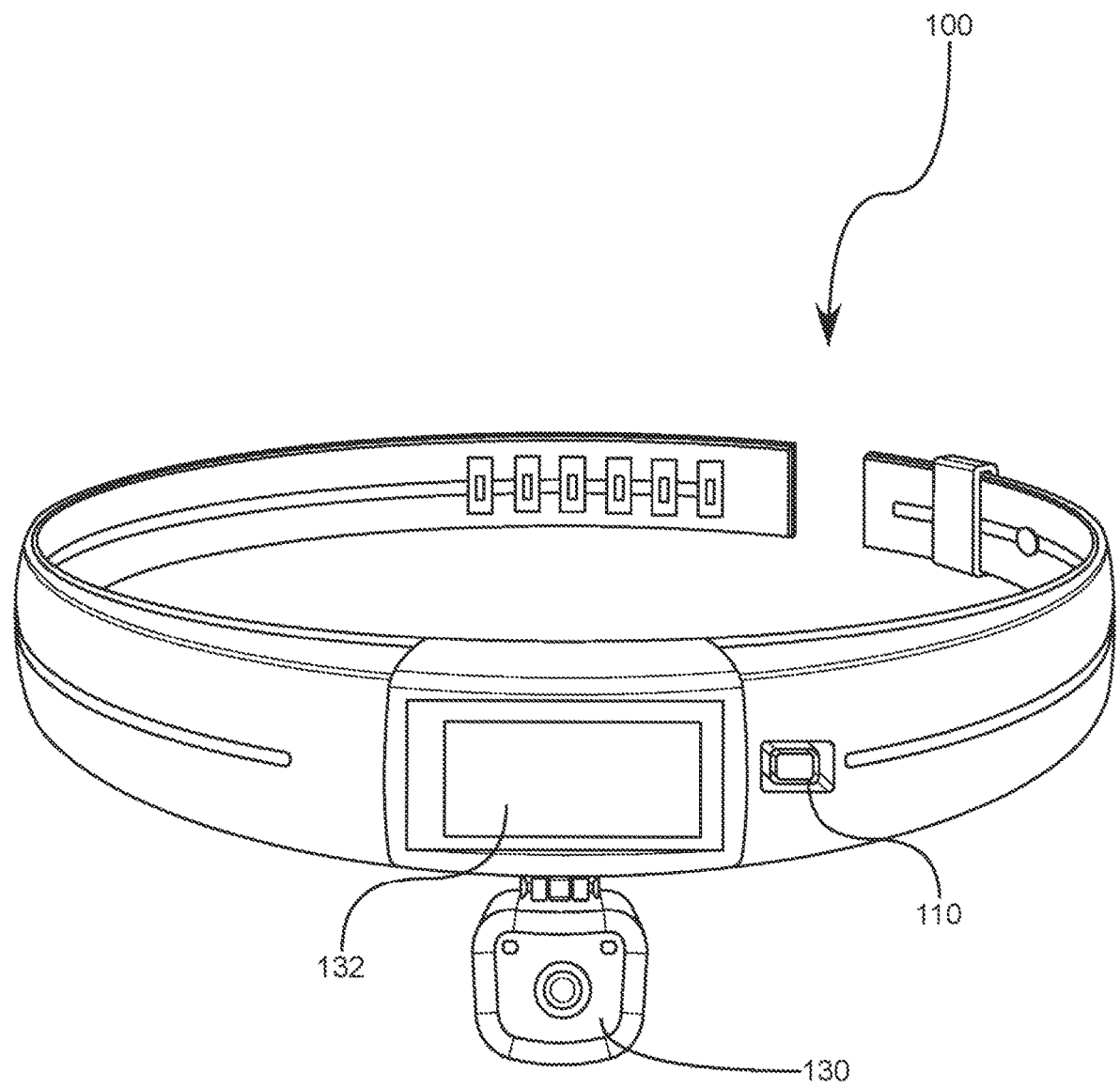
FIG. 1 illustrates a front perspective view of an exemplary pet collar for use in a location-based pet training system as contemplated herein.
Figure 2:
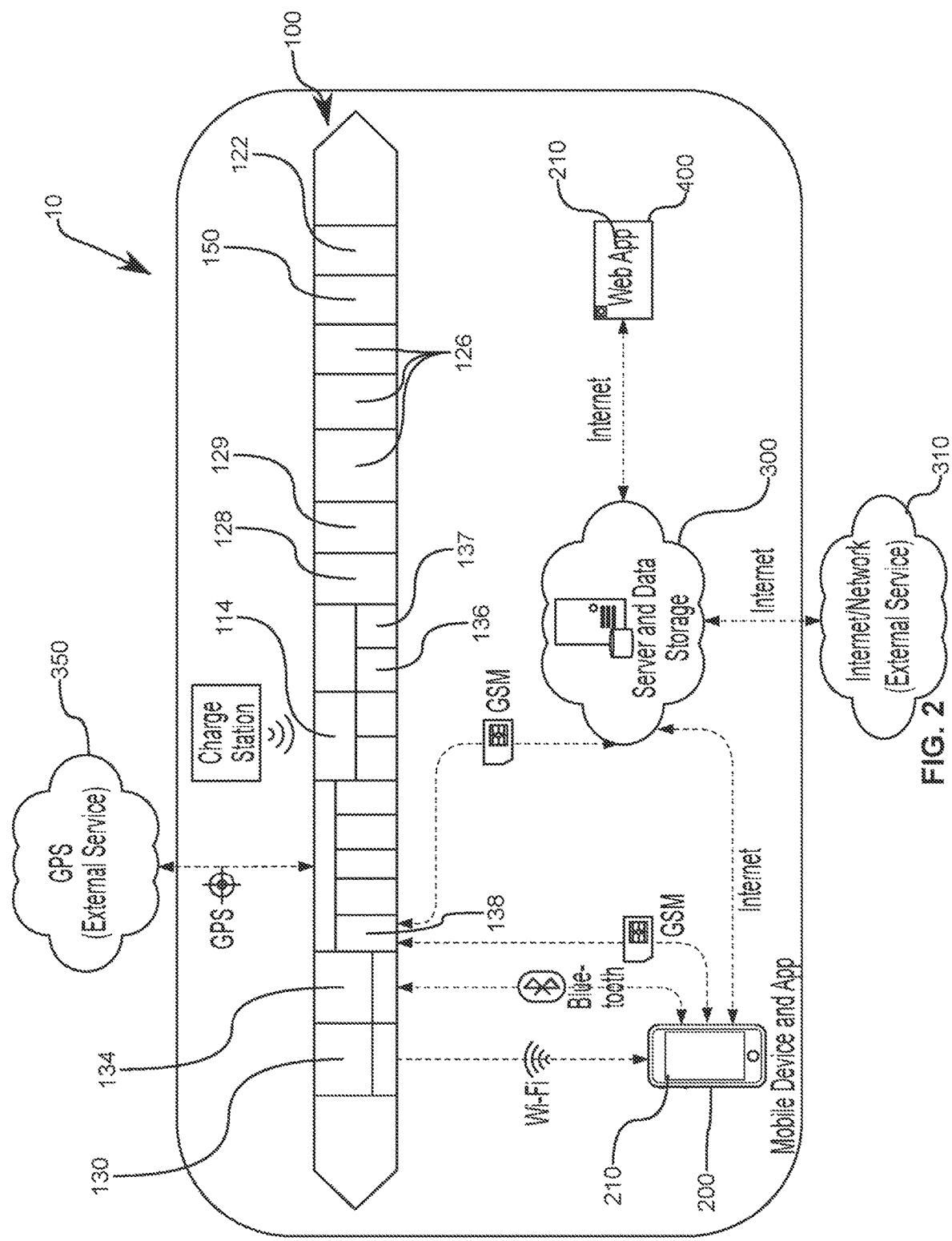
FIG. 2 illustrates an exemplary schematic of a location-based pet training system illustrative of various inventive concepts thereof.

In accordance with these concepts, the system as contemplated can include a collar 100, as shown in FIGS. 1-2 which is configured to be affixed to a pet 20, the collar 100 can have a location determination mechanism 110 embedded therein which can provide a location of the pet 20. In some instances, the location determination mechanism can be a global positioning system (GPS) which can be utilized to provide a location of the pet within a certain degree of certainty using an external GPS location service 350. It will be appreciated that GPS is discussed herein in detail with the understanding that various location determination mechanisms can be utilized, including alternative sensors, triangulation methods, range finders, radio signals. Cellular chips, and other wireless transmitters, such as a wi-fi transmitters and Bluetooth transmitters, can be used to identify the smart collar's location related to a permitted zone and can be used to identify location of the animal in general based in part on connectivity, signal strength and the methods noted above.

Figure 3A:
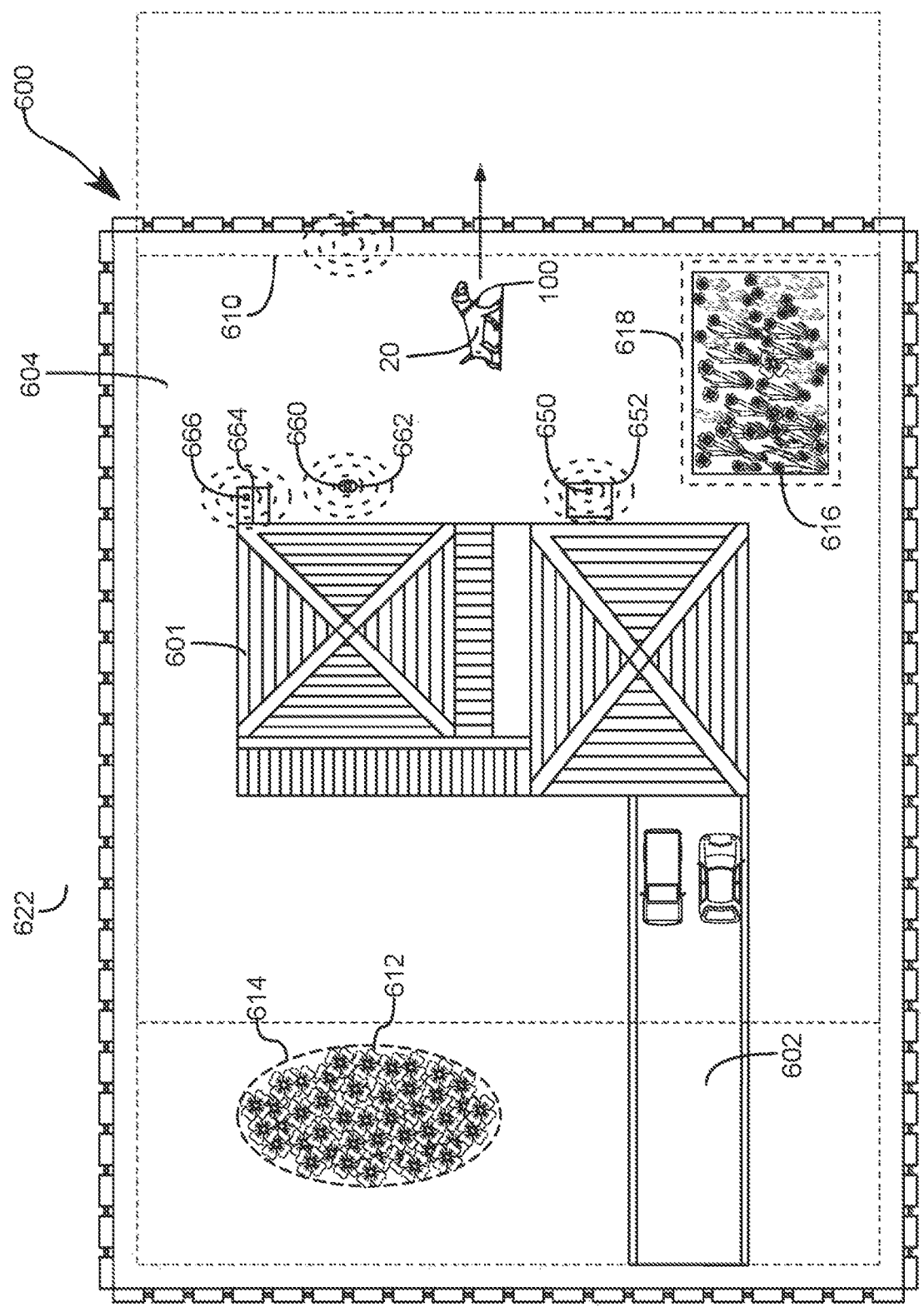
FIGS. 3A-B illustrate top down locational views of various permitted and restricted zones and illustrating various use scenarios for training of a pet utilizing the location-based pet training system as contemplated herein.
Figure 3B:
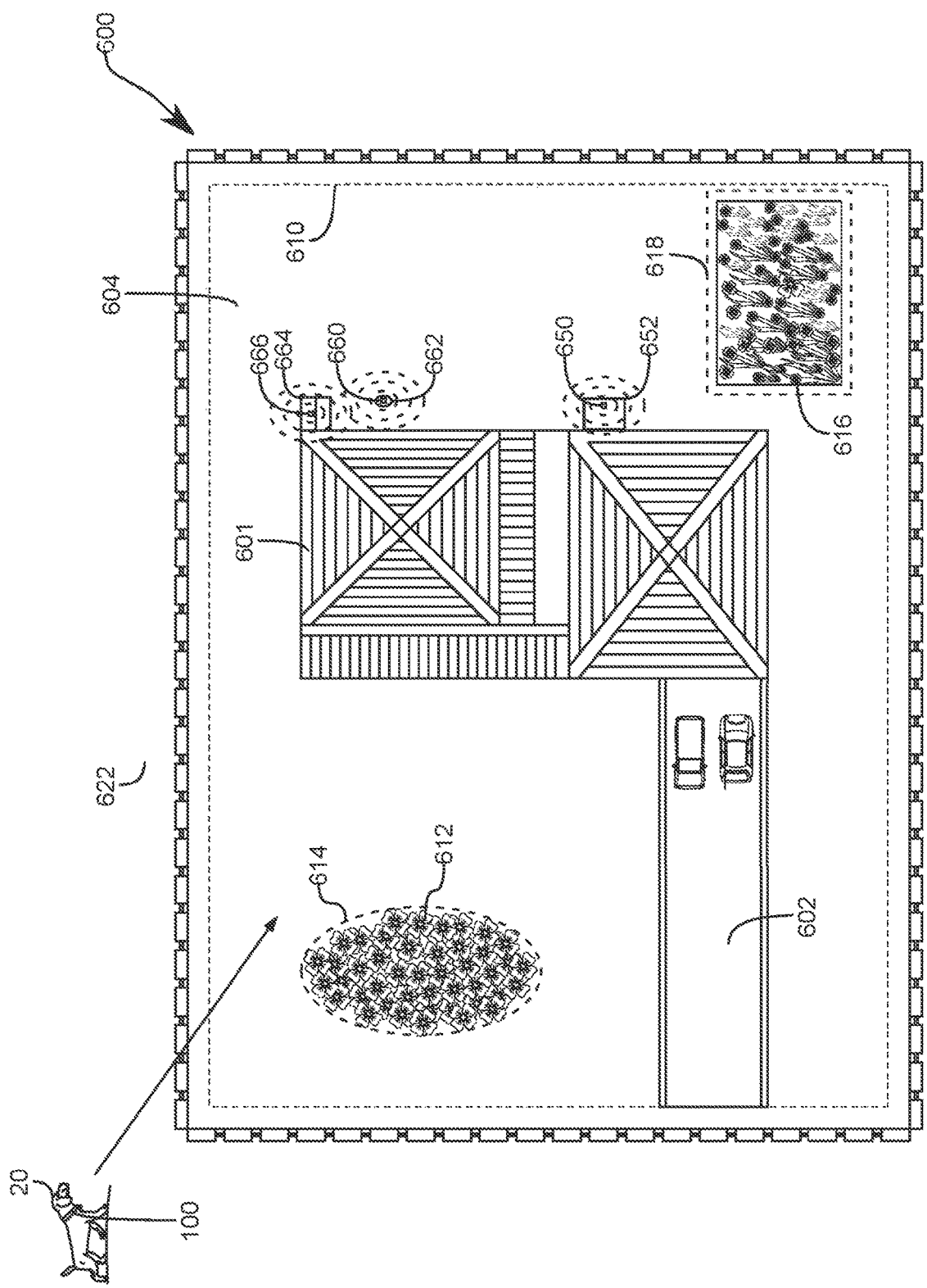

It will be appreciated that permitted zones can be defined using various methods, either within a connectable distance as discussed above, or alternatively the system 10 can be provided with a user portal 210 or web app which can present an interactive map to the user. It will also be understood that the user portal 210 can be presented to the user or interacted with by the user via an application on a mobile device 200 or using an online web portal 400. The interactive map can then be utilized by the user to draw boundary lines on the map and define interior or exterior portions of the boundaries as restricted or permitted zones. FIGS. 3A-B illustrate an overhead map view 600 with various defined boundary lines 610, 614, and 618 provided thereon. In this instance, the permitted zone can be listed as 604, which can coincide with a boundary of a piece of property around a house 601 and driveway 602 where the pet is allowed to stay and travel anywhere within this permitted zone 604. However, as illustrated the exterior portion of the boundary line 610 can be defined as a restricted zone 622, which indicates an area outside the yard. It will be appreciated that alternative restricted zones can include restricted zones which are actually inside or encompassed by the permitted zone. Some examples might include a restricted boundary 614 around a flower bed 612, or a restricted zone 618 around a garden plot 616. These restricted zones residing within a permitted zone are offered only for purposes of discussion and can encompass virtually any desired restricted area as determined by a user.

Also illustrated in FIGS. 2 and 3A-B is an alternative embodiment wherein the collar can also be provided with additional sensors about the collar which can enable the collar to provide more information than merely location, but interaction information with various alternative objects as well. In some instances, the additional sensors can include microphones, radio frequency identification (RFID) transmitters and sensors 150, proximity, light, infrared, accelerometers, etc.

By providing additional sensors 650, alternative activities can also be determined or controlled. In some instances, particularly for small restricted areas, 5 ft or less across, GPS, while accurate on a large scale, can be too inaccurate to define such a small restricted area. Some examples might include restricting the pet from chewing power lines or controls for an air conditioner 652, or power, cable, telephone lines. In some such instances a proximity sensor, such as RFID (passive or active), or near field communication (NFC) sensors and transmitters can be provided about such areas, wherein the proximity of the collar to a specified area can be detected, and a negative stimulus provided by either vibrator 136 or electro-shock component 137 when such a proximity is detected.

It will be appreciated that providing negative stimulus, such as through an electrode or the electro-shock component 137, and associated electric shock has been utilized in many previously known systems and is known as a relatively effective training method. However, one aspect of the present invention involves providing not only a negative stimulus for a negative behavior, but also allows for providing a positive stimulus for corrective behavior or desired behavior. In particular, one aspect of the present invention involves providing a positive stimulus when a pet moves from a restricted zone to a permitted zone, or does something else that the user deems as a positive behavior. In order to provide positive stimulus, the system as contemplated can also include an audio transmitter 122, such as a speaker, which can be configured to provide an audio stimulus in the audible range or at ultrasonic frequencies which can be heard by the pet, but not the owner/user. In such cases, the audio transmitter 122 can be configured to provide an audio signal which can be either pleasing or unpleasant to the pet in response to determined behaviors. The audio transmitter 122 can provide positively trained sounds or recordings when positive activities are determined. For example, the user could record an audio recording of their voice offering praise to the pet, then the audio recording can be played to the pet when the pet comes back into the permitted zone from a restricted zone. Thus, secondary sensor 660 can be utilized to generate the positive reinforcement mechanisms associated with system 10 and collar 100. Whereas sensor 650 is utilized to trigger or generate the negative reinforcement mechanisms associated with system 10 and collar 100.

An example of this positive reinforcement process could involve a location detection that the pet is approaching a restricted boundary. As illustrated in FIG. 3A, the collar 100 can be configured to provide a warning to the pet, through a vibration or another audible signal. If the pet continues to move past the boundary, an electric shock can be applied to the pet in gradually increasing increments until it becomes clear that the shock is ineffective, i.e. for a predetermined time, or for a predetermined distance past the boundary. Such a noise can be an innocuous beep, which the pet can learn to associate with a negative stimulus if a particular behavior, distance, or boundary is continued or disregarded. However, when the pet approaches the boundary from a restricted side, as illustrated in FIG. 3B, the system 10, by means of the location mechanism 110, can determine that the pet is already in a restricted zone, and moving toward the boundary from that restricted side toward the permitted zone. In this instance the audio transmitter 122 can instead be configured to play an audible recording of praise for the pet.

It will then be appreciated that there exist explicitly defined permitted and restricted zones, however, there also exists the possibility that a particular zone is not explicitly defined and as such can be an undefined zone. It will then be appreciated that the negative stimulus can be applied on all of the following transitions: allowed zone to undefined zone, undefined zone to restricted zone, or allowed zone to restricted zone. Positive stimulus can then be applied on all of the following transitions: restricted zone to undefined zone, undefined zone to allowed zone, and restricted zone to allowed zone. It will further be appreciated that one or more user settings can be changed so as to automatically define all undefined zones as restricted zones, particularly when defining an enclosed permitted zone. As such, since there is at least one allowed zone, then all areas outside that allowed zone are, by definition, restricted, whether explicitly designated as such by the user or implicitly by default.

It will be understood that the audible signal can be configured to be any number of sounds, any of which can be trained to be a positive reinforcement sound for the pet. For example, with professional dog trainers the trainer can use a clicker which makes a particular noise, and give the dog a treat whenever they produce the sound with the clicker. Similar methods can be used in the present invention, and virtually any given sound with a predetermined or trained response from the pet can be utilized for this positive reinforcement. In some embodiments, such sounds can include chimes, or an ultrasonic version of any of the other sounds discussed above.

Further, it will also be understood that the audio transmitter can also be used for negative reinforcement, rather than using electric shock. In such cases the user can record a verbal reprimand, or some other negative reinforcement noise so as to provide a more humane negative reinforcement over the electric shock and electrode methodology.

In some such embodiments, the system can be configured to provide an audible command through the audio transmitter, which could be a particular sound, or audio recording which warns the pet that modes are changing, and gives a particular pre-set time period in which the command must be obeyed. For example, the speaker could transmit a sound of the user giving the command "to bed", and after thirty seconds the modes will change, and if the pet is not in the bed or dog house 664, it can get a warning vibration or beep, followed by a negative reinforcement. Conversely, if the pet obeys immediately, the collar can be configured to provide a positive reinforcement, such as a recording of "who's a good boy" when the command is obeyed upon a zone permission change, in which case a negative reinforcement was not needed, but a positive reinforcement would still be advantageous.

Similarly, a user can use positive reinforcement sounds or mechanisms in conjunction with an 'action' sound, such as a dinner bell, to train the animal to go to their feeding dish. Upon movement towards and/or arrival at the feeding dish the positive reinforcement sounds or mechanisms can be triggered. Furthermore, a combination of positive reinforcement for a first animal and negative stimulus for a second animal can be implemented where each animal has a collar. The user interface can trigger the "action" sound in the first animal's collar and use the positive reinforcement mechanisms as the first animal obeys. However, if the second animal tries to come toward the first animal's feeding dish, for example, a negative stimulus could be implemented to train the second dog that is either not their feeding time or that feeding dish is not their feeding dish. Thus, sensors 650 and 660 could be used interchangeably to trigger both positive and negative stimulus depending on which collar (associated with the first or second animal) is within the vicinity of the zone, toy, feeding dish, doghouse, etc.

In light of the above embodiments, it should be appreciated that zones or areas such as dog house 664 or feeding dish 662 can be configured to induce positive feedback, negative feedback, or no feedback based on the time of day or a particular setting that is automatically set or manually triggered by a user. As mentioned, some of these zones or areas might be too small for accurate GPS or Wi-Fi signals, thus having additional sensors 666 attached to or near the designated zone, toy, dog house, feeding dish or bowl, and so forth can greatly enhance the facilitation of training certain behavior in the animal.

In some embodiments, the user platform can include a dedicated screen in the application being devoted to hands-on training. As desired, the user can press a positive button to cause the collar to issue the positive reinforcement signal to help with real-time association of a particular sound with positive reinforcement. As such a separate button on the same screen can then cause the collar to issue the negative reinforcement signal(s) for real-time association of a particular sound with negative reinforcement.

With this interface, a trainer can perform general training with the collar's reinforcement signals instead of, or in addition to, traditional reinforcement signals.

In this manner, if the user desires to teach a pet to use another object, i.e. a door, feeder, toy, bed, etc., then the positive reinforcement signal can be issued upon the pet interacting with that object. Interaction with the object can be detected, as discussed above, via RFID.

In this manner, such as when a dog is being trained in the field for police, fire, military, or rescue purposes, the positive reinforcement signal can be issued when the dog correctly reaches a desired objective, for example a dummy person to be rescued, or when an assailant is disarmed.

Alternatively, such as during agility training, the positive reinforcement signal can be issued when a dog correctly navigates each obstacle.

Further, when training a dog to identify drugs, bombs, or toxic substances, the positive reinforcement signal can be issued when the dog identifies the target object or substance.

It will also be understood that a power source 114, such as a battery, can be provided within the smart collar which is configured to provide power to each of the aforementioned accessories, sensors, etc. The power source can be configured to be rechargeable either through a power port, or can incorporate wireless charging technology.

As discussed in some detail above, the system will include a user platform 210, such as an application, which can be configured to receive input from a user (not shown). It will be understood that the application/user platform can be accessed through mobile devices, web portals, or any number of suitable means. It will be understood that the platform is operable to define at least one permitted zone where the pet is permitted to reside and at least one restricted zone where the pet is restricted from entering. This can be achieved by defining or drawing boundaries, for example on a map.

Figure 4:
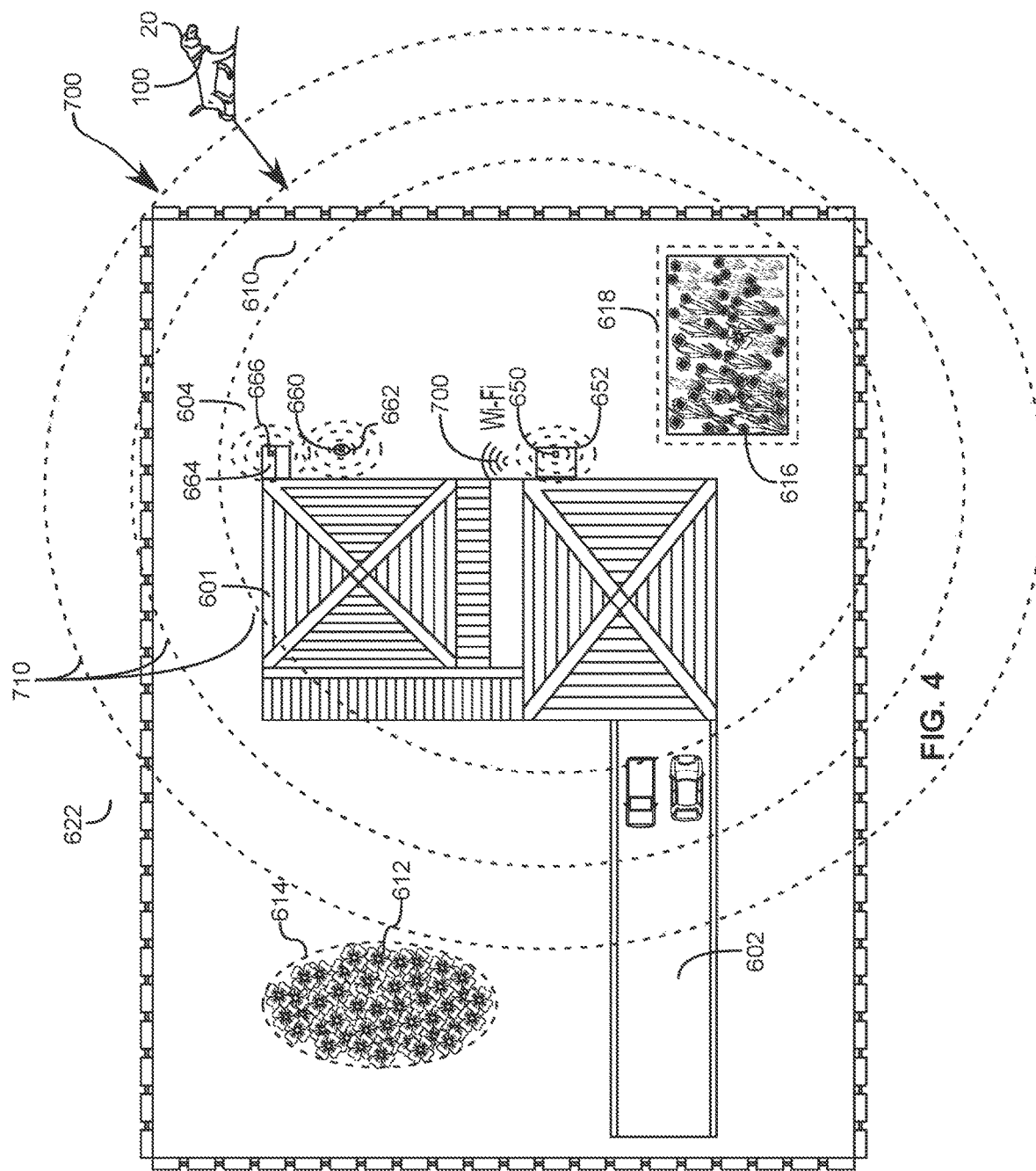
FIG. 4 illustrates a top down locational view of various permitted and restricted zones and illustrating an alternative boundary determination means illustrating an alternative scenario for training of a pet utilizing a location-based pet training system as contemplated herein.

Alternatively, and as shown in FIG. 4, the boundaries could be defined as whether the collar is able to connect to a central transmitter such as a wi-fi router 700, etc. In some such instances, warnings can be generated based on signal strength thresholds 710 corresponding to various permitted distances from the wi-fi router 700, which can be correlated to relative proximity to the router. In some instances, this could be achieved using other radio transmitters etc.

It will also be understood that the aspects of the present invention with regard to positive reinforcement could also be implemented using physically buried boundary lines, or other physical electrical lines provided about the boundary.

Additionally, it will be understood that the collar can be provided with a local processing unit and non-transitory computer-readable media for tracking location or activities and saving data with regard to those activities locally. Such a local processor and non-transitory computer-readable media can store computer instructions wherein sounds, warnings, positive reinforcement, or negative reinforcement steps and when applied can each be determined locally and performed locally after transfer of such instructions from the user platform. Accordingly, the user platform can be connected to a remote server 300 having a remote processor and non-transitory computer-readable media can be utilized remotely, and instructions can then be transmitted to the collar to perform any such step or action using a mobile or home network.

Additionally, the collar system can include various sensors and interfaces including but not limited to a tangible display 132 providing pet identification information optical sensors, i.e. a cameras 130, a Global Positioning System (GPS) 110, RFID 150, infrared communication mechanisms, accelerometers, wi-fi adapters, Bluetooth adapters 134, SIM or GSM communication modules 138, temperature sensors, microphones, light sensors, ultrasonic, radio or virtually any other contemplated sensor which would be recognized by those having skill in the art as useful so as to provide a desired feedback regarding a pet activity, it will be appreciated that these various sensors are indicated by the single reference number 126, but can be provided as virtually any sensor which would provide information regarding a particular activity, parameter, or characteristic. Additionally, the collar can be provided with an interactive display 128 which can be used to access information or settings of the collar by a user. In some embodiments, the collar can also include lights 129 or other indicia which can aid in pet location when lost, particularly at night or other dark conditions. Such a light 129 can also be illuminated automatically in low-light conditions so as to aid in visibility, such as on walks for passing motorists, etc.

The system can also include processing capabilities and data storage capabilities which allow for activities to be determined, stored, and enter a desired mode based on a predetermined set of instructions in response to input or commands from the various sensor or commands provided through the communication systems. In some instances, pet data can be transmitted and stored over an external network or service 310 for data tracking of various pet activities, parameters, etc.

In various aspects of the present invention the various sensors can be divided into various primary groups and subset groups. In response to various sensor inputs the collar 100 can be prompted to enter into various modes wherein various primary and subset groups. For example, the GPS location sensor can detect that the pet, or at least the collar 100, has not moved in the last thirty minutes, in response to the sensor input the collar 100 can go into a sleep mode and turn off various sensors and only send out an intermittent location ping until movement is again detected, in this manner, power can be conserved by changing into various modes based on sensed data. In yet another example, the audio sensor or microphone in combination with an accelerometer can detect for example when a dog is barking, in response to a detected barking over a predetermined timeframe, in response the collar 100 can then activate the optical sensor or camera so as to detect or otherwise capture an image or video of what the dog is barking at. It is thus contemplated herein that various sensors can be primary sensors and can cause the collar 100 to enter various modes wherein various sensor subsets are activated or deactivated in response to sensor input. It will be appreciated that the collar system and application can have a predetermined mode set, and in some instances custom modes can be created or certain sensors can be manually controlled using the mobile application.

The mobile application, which can be specifically designed to connect to the collar 100 using Bluetooth technology on a smart device, can allow for control of the collar 100 itself in real-time. For example, an active mode or a user connected mode can allow the pet to leave a predetermined area without signaling alerts to a previously defined area perimeter.

In yet additional embodiments the collar 100 system can be connected to a control system or program during a charging process or other hard connection means when not being worn by the pet. Such connection and charging means can be provided using USB or other serial connections and charging methods.

It will be appreciated that other modes can be triggered using alternative methods, such as low power detection, wherein the device can enter a power saving mode and certain power draining sensors can be limited or otherwise. In such modes, power can be conserved by turning sensors such as the optical sensor, microphone, wi-fi and Bluetooth adapters off and only sending out the occasional location ping for purposes of pet location. It will be appreciated that in the event of a lost pet, that the most critical function is finding the pet, and other sensors for the purpose of tracking pet activity will become less important to an owner, meanwhile location functionality for the longest possible power duration will become most critical.

It will be appreciated that some sensors or communication adapters can be set into standby mode until the owner comes within range. In some embodiments, the power preservation mode can be automatically triggered when the pet wearing the collar 100 leaves a designated perimeter, or gets a certain distance from a set geolocation. In such an embodiment, the GPS locator can be considered a primary sensor primary and the other sensors on the collar 100 can be provided in a sensor subset in a turned off configuration. It will be further appreciated that circumstances can vary widely and that the control system, being provided on a mobile application for example, can be connected to the collar 100 and can override certain settings. For example, an owner may wish to take the pet somewhere for exercise, for example on a jog, and that the mobile application can tell the on-board collar 100 controls not to enter a lost and power conserving location mode when the owner and the pet leave a designated perimeter. It some instances a switch can be provided or a specific mode can be manually selected using a display or other user interface on the collar 100 itself so as to allow for different control and subset modes based on specific situations. For example, a traveling mode could be selected wherein a specific sensor subset configuration can be set up and created by the user/owner for a specific desired activity.

In some embodiments, the collar 100 can be configured to automatically enter certain modes and configurations based on additional sensor input. For example, if the location sensors determine that the collar 100/pet is traveling at a speed which is faster than the pet can travel unassisted, it can be reasonably assumed that the pet is not lost, but is rather in or on an owner/user operated vehicle. Or alternatively, if the pet is outside a designated area but remains connected via Bluetooth to the user's mobile application on a smart device, that the pet is not lost but is with the owner, and as such certain sensors will remain active while the pet and owner are together and away from home and can track the activities even though a default function would be to enter a power saving mode.

In some embodiments, the collar 100 can be configured to connect periodically using alternative connection means such as using a GSM or SIM to a mobile network and can cause alerts to be delivered to the user/owner under certain circumstances. In this exemplary embodiment an alert can be generated and delivered to the owner/user's smart device that the pet has left the property, and can ask the user/owner for a response input. For example, the pet has left the yard, is the movement authorized or is the pet lost. In response to the notification, the user/owner can then select and send a command whether the collar 100 should enter power saving location mode or whether the collar 100 should enter an alternative supervised mode which will keep certain alternative sensor subsets active based on the owner authorized activity.

In some embodiments, the collar 100 can be set into various primary modes such as, at home, or roaming/traveling, away from home, etc., which modes can control various sensor subsets to behave in customizable or predetermined ways. For example, in a roaming or walking mode, the GPS can become more active and track the distance traveled and a distance calculation can be performed between the location of the collar 100 and the location of a mobile smart device such as a smartphone indicating the location of a user/owner. A predetermined distance allowance can then be calculated and the pet can be permitted to operate or run within the zone and the collar 100 will remain in the specified walking mode so as to operate as a wireless leash.

FIGS. 5-8 illustrate an exemplary top down locational view of a geofenced area as contemplated herein. A geofenced area may include multiple zones, the examples shown in FIGS. 5-8 illustrate four zones I, II, III, and IV. Each zone contains natural and or man-made features such as buildings, topographic features such as hills or mountains 802, and trees 804. Each zone receives various communication signals such as GPS signals from satellites 806, cellular phone signals from cellular towers 808, or WIFI signals from public or open WIFI hotspots 810. For each zone, the types of signals that are available to access and the strength of the signals varies based upon the location of the signal's source and the topographic (or man-made) features that impede various signals. For example, zone I has two WIFI hotspots 810 and unobstructed view to a GPS satellite 806. However, zone I has limited to no cellular signal because the signal from the only cellular tower 808 in the region is obstructed by mountains or hills 802. Zone II has unobstructed view to a GPS satellite 806, but does not have any WIFI hotspots or cellular signals. Zone III has GPS signals and cellular signals but does not have any WIFI signals. Zone IV has GPS signals and cellular signals, but the cellular signals are not as strong as the cellular signals in zone III because the distance to the tower is greater and the trees and buildings may attenuate the signal.

Figure 5:
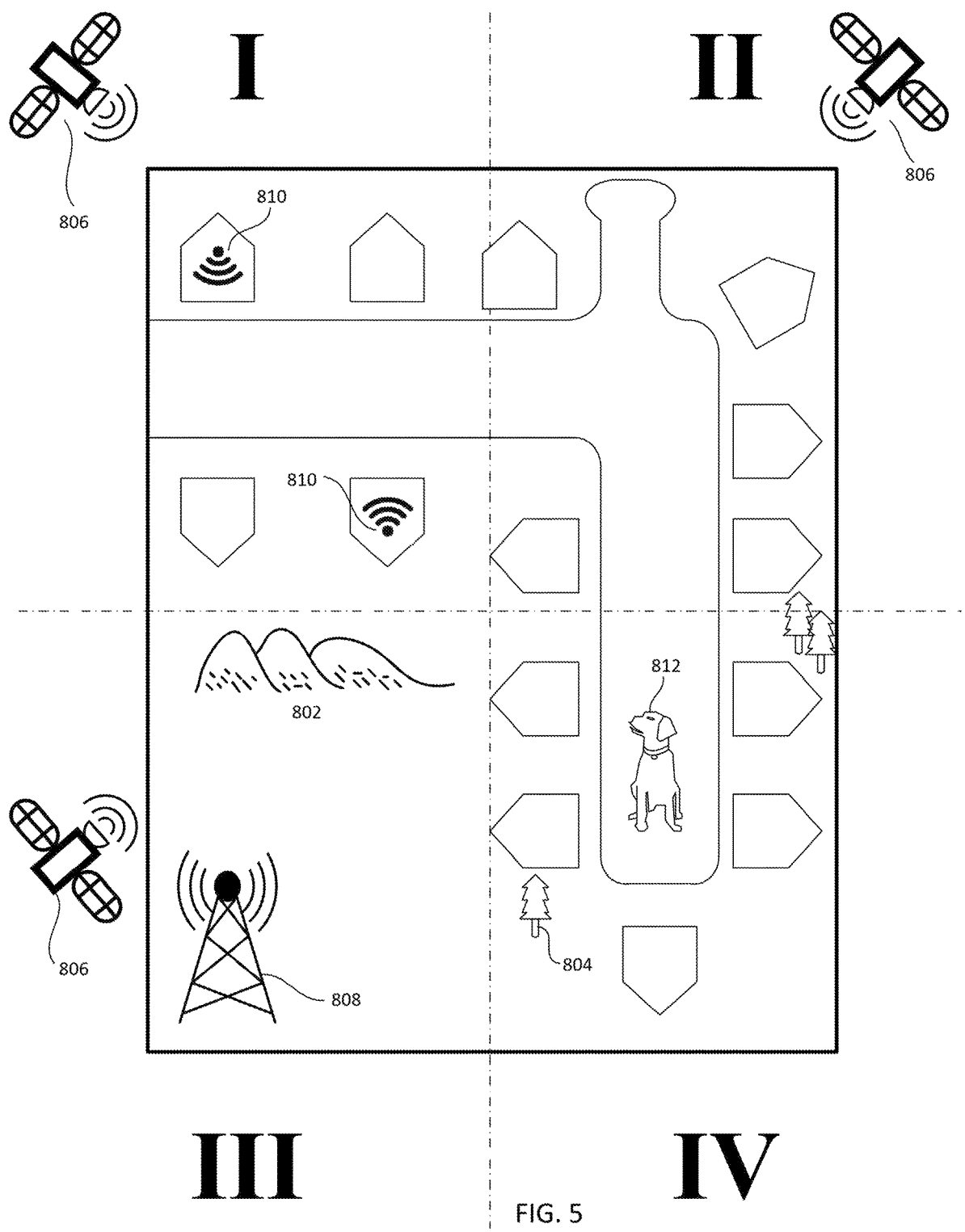
FIGS. 5-8 illustrate exemplary top down locational views of quadrants or zones of a pet location determining system as contemplated herein.
Figure 6:
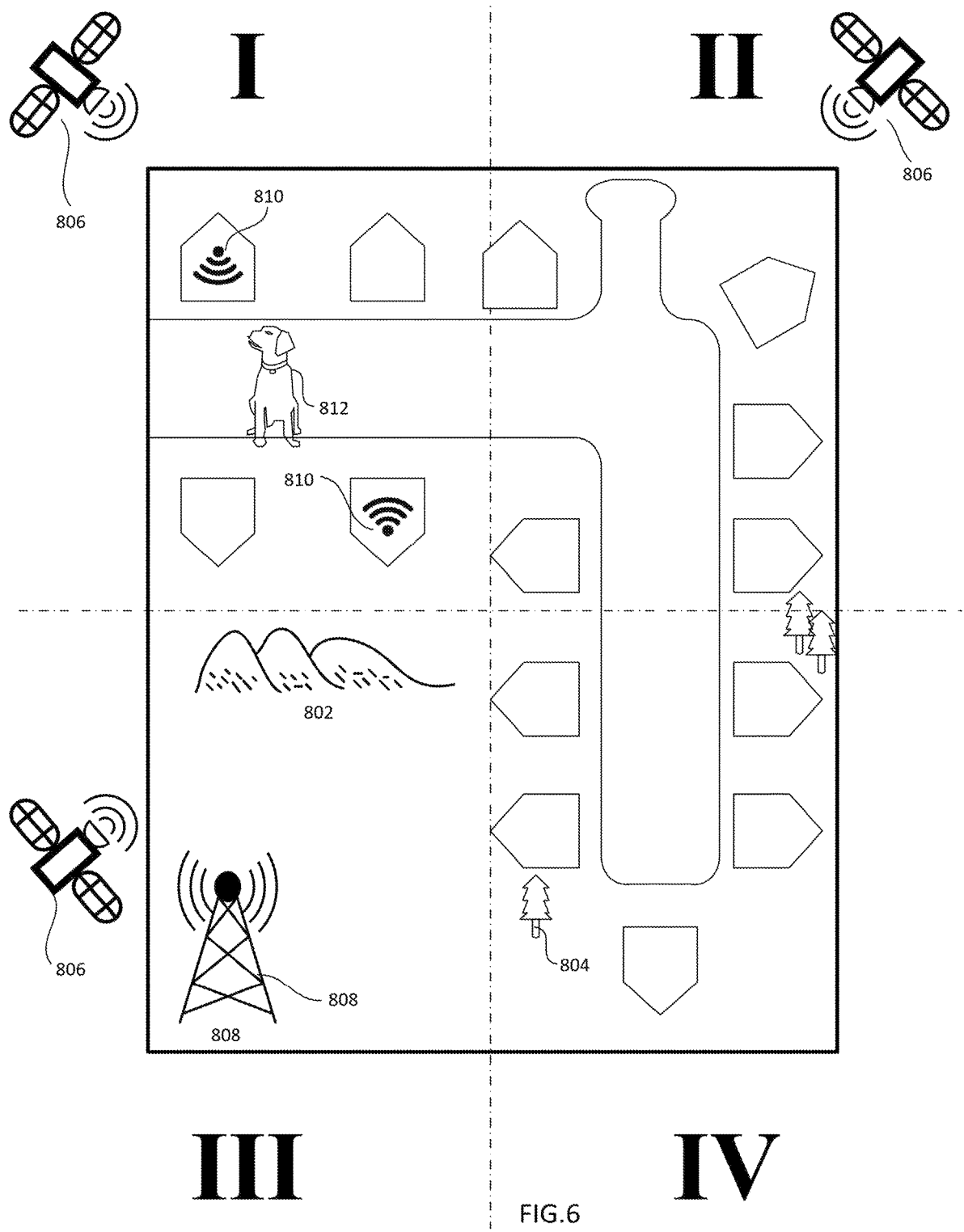
Figure 7:
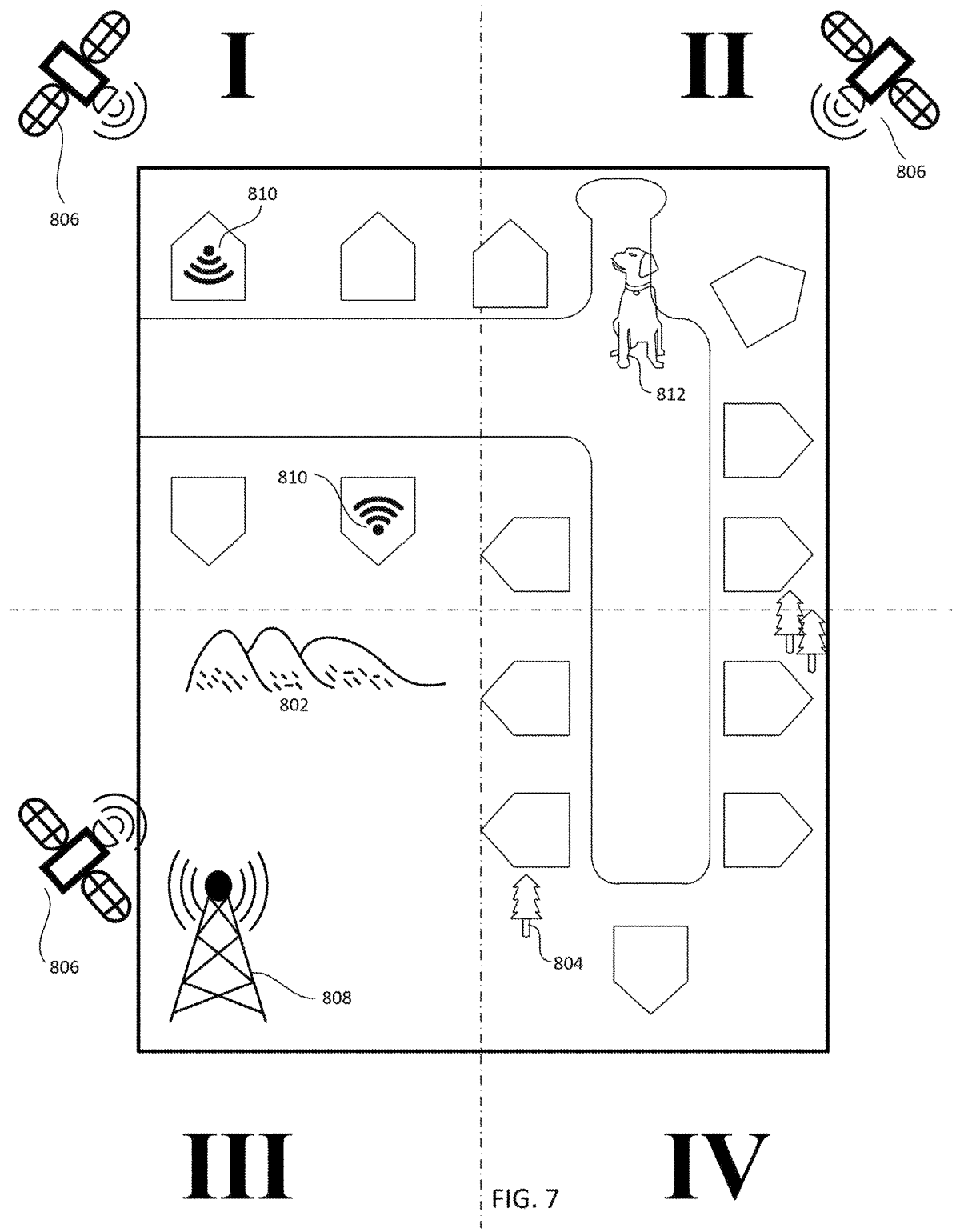
Figure 8:
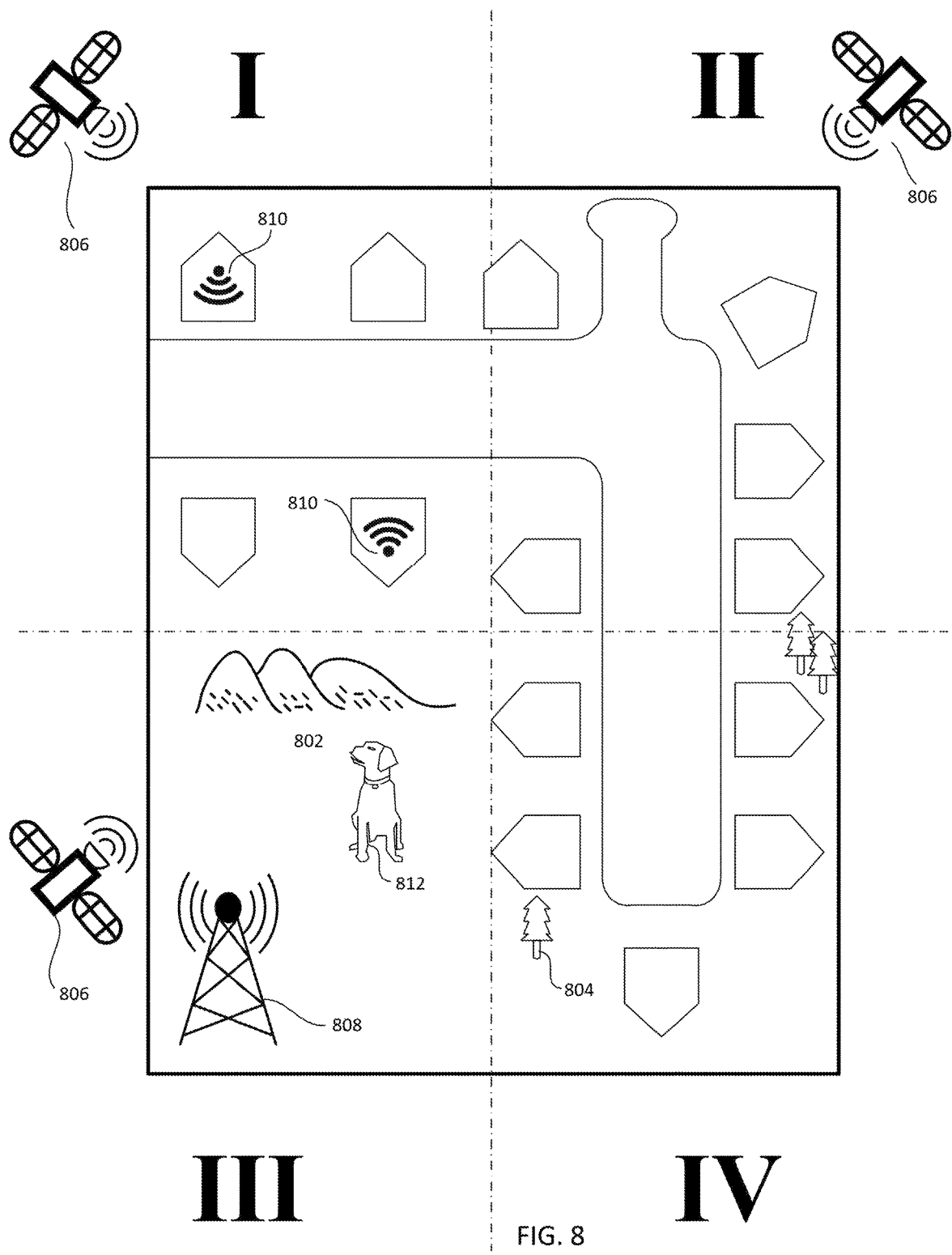

Because each zone has different communication signals available in various strengths, to extend battery life it is important to optimize how the smart collar communicates while the animal is located in each zone. For example, when a pet 812 is located in zone IV (as shown in FIG. 5), the pet location is best determined by using GPS signals and cellular signals. When a pet is located in zone I (as shown in FIG. 6), the pet location is best determined by using GPS signals and WIFI signals. If the pet is located in zone II (as shown if FIG. 7), the pet location is best determined using GPS signals. Finally, when the pet is located in zone III (as shown in FIG. 8), the pet location is best determined using cellular signal and GPS signals. Methods of determining a geofenced area will be described in more detail below. Within each zone, the signal strength of each of the available types of signals may vary as noted, thus, when for example the pet is located in zone IV if the GPS signal becomes weak or unreliable the smart collar can know to switch to cellular communication and vice versa, as opposed to switching to or searching for WIFI signals.

It should be noted that the consumption of energy can be determined by a number of factors including signal strength, type of signals, and the necessary processing required to determine location. Referring to the processing required, if the smart collar can 'see' a particular public WIFI hotspot, the system (based on the uploaded communication strategy) can understand that the WIFI hotspots have a limited range, thus if the smart collar is receiving an identified WIFI hotspot signal it doesn't necessarily have to do additional processing to determine more accurate location information, because the reach of the WIFI hotspot is finite or limited in range as compared to the range of cellular signals from a cellular tower and the even further range of GPS signals. In other words, if the smart collar is communicating with a particular WIFI hotspot it knows it is already in zone I, per the above example, as the WIFI signals don't extend beyond zone I. Responding to that WIFI signal may be unnecessary, or at least the requirement to do so can be done less frequently. It should also be understood that not having to power certain chips (GPS, Cellular, WIFI, etc.) to search for signals can preserve additional power.

Figure 9:
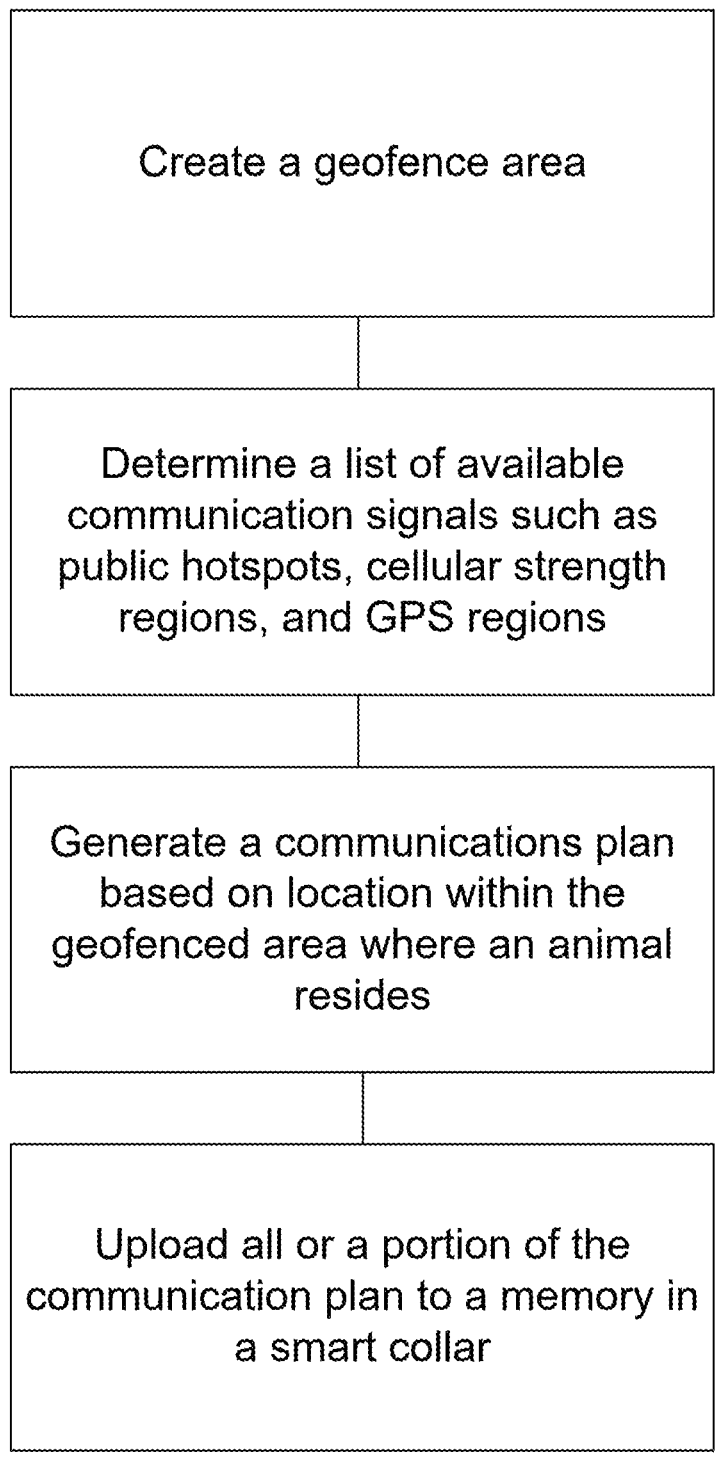
FIGS. 9-10 illustrate flowcharts for creating a geofence and extending battery life of a smart collar.

In one embodiment, shown in FIG. 9, a method of creating a geofence and extending battery life a smart collar includes determining for the geofenced area a listing of available public hotspots, cellular strength regions, and GPS regions (i.e. a list of signal data). This step may be performed by using a smartphone, or other portable communication device, to test the various signals in areas of the geofence. Alternatively, this step may be performed by using a computing device or smartphone connected to a network to gather signal data from a remote database. The list of signal data is used to generate a communications plan that will instruct the smart collar to use specific signals for specific locations, as well as switch between specific signals that are noted to improve energy conservation of the battery of the smart collar. At least a portion of the communication is uploaded to the collar's memory.

For example, referring once again to FIGS. 5-8, a user lives in zone II of the exemplary geofenced area. A communications plan is generated that where the smart collar will use only GPS signals to track the user's pet when the pet is outside of the user's home. The communication plan may also include instructions to use GPS signals and public WIFI hotspots when the pet is zone I.

In one embodiment, the communication plan is modified as the pet moves around the geofenced area.

Figure 10:
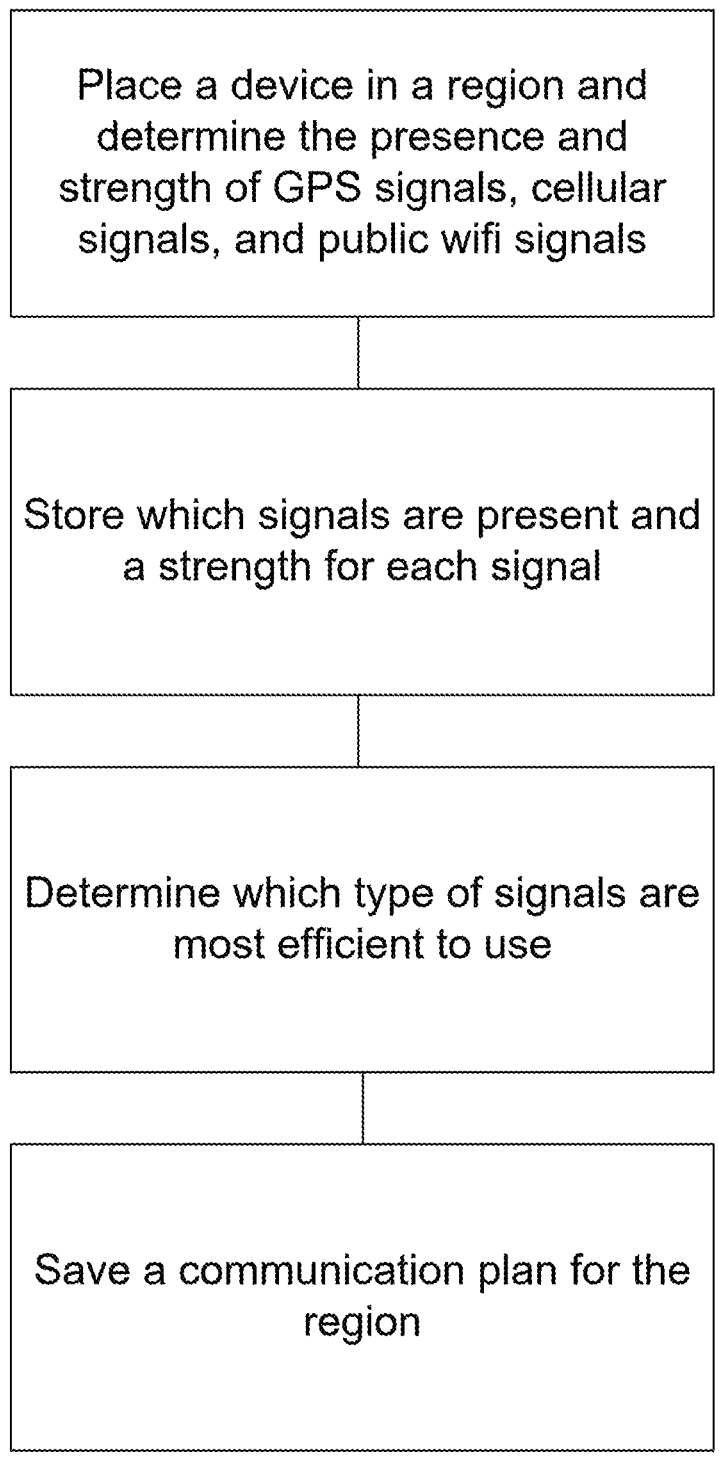

In one embodiment, shown in FIG. 10, a method for creating a geofence and extending battery life of a smart collar includes placing a device in region. The device is used to determine the presence and strength of GPS signals, cellular signals, and public WIFI signals (hotspots). The presence and strength of the signals is stored and the stored data is used to determine which type of signals are most efficient to use and drain the battery the least. A communication plan is saved which instructs which signals to use within the region. These steps are repeated for additional regions, and a communication plan is stored for each region. Alternatively, one communication plan that contains instructions for multiple regions can also be stored.

Figure 11:
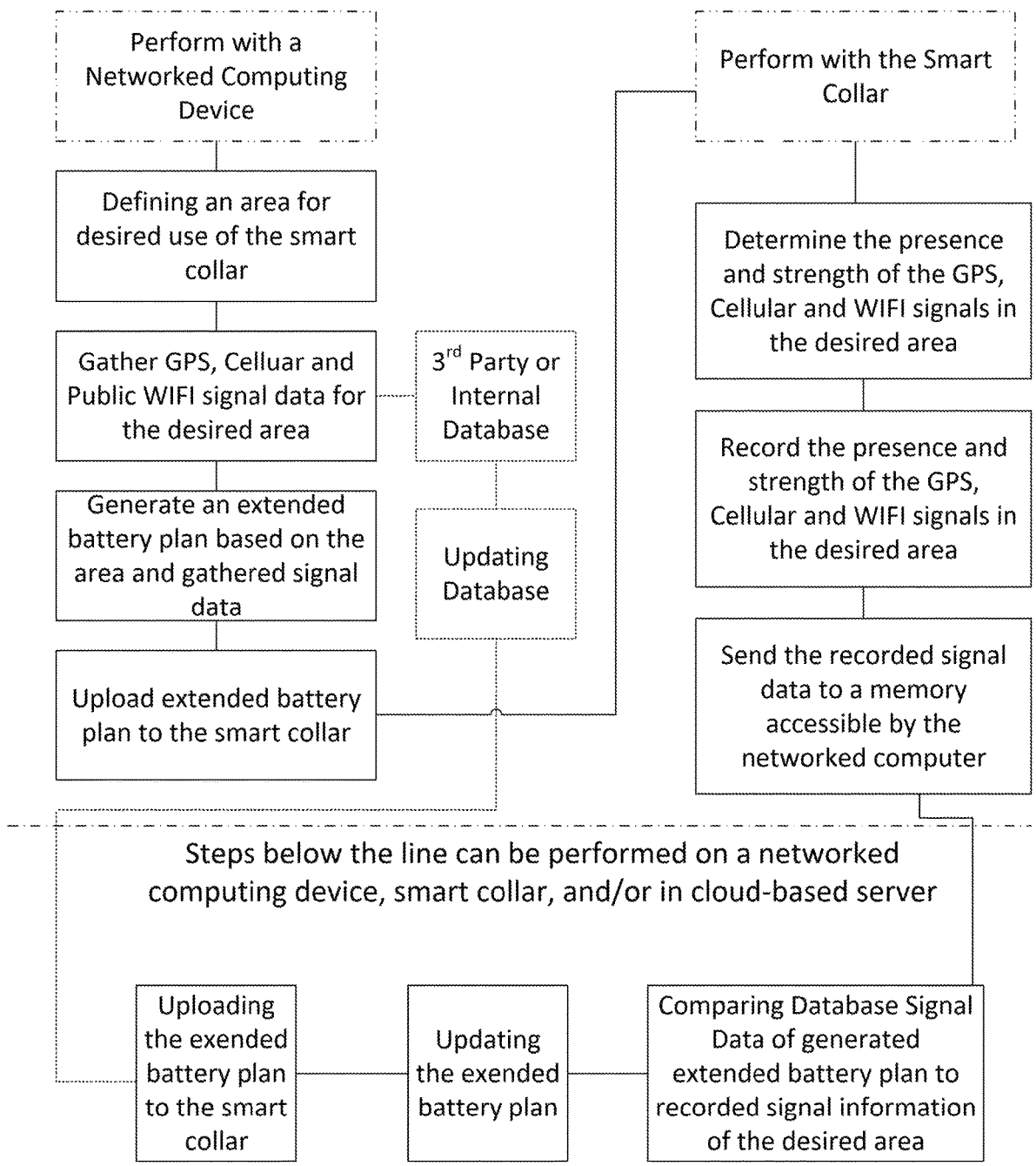
FIG. 11 illustrates a flowchart for extending battery life in a smart collar.

FIG. 11 illustrates a flowchart of another embodiment, a method of extending battery life of a smart collar includes using a networked computing device to identify an area for desired use of the smart collar, gather communication signals, and generate an extended battery plan. A networked computing device may be any type of computing device connected to a network such as a desktop computer, a laptop computer, a tablet, or a smartphone. Communication signals include GPS signals, cellular signals, and public WIFI signals. The extended battery plan is uploaded to a smart collar and stored in a memory device of the smart collar. The smart collar is used to determine a presence and strength of communication signals and record the strength data of the communication signals. The signal strength data is sent to the networked computing device, or sent and stored in a memory device accessible to the networked computing device. The memory device may be any suitable type of memory such as cloud storage, a hard drive, a flash drive, or a network memory. The signal strength data is compared with to the signal data from the remote database and the extended battery plan is updated based on the compared signal information. The updated extended battery plan is uploaded to the smart collar.

Additionally, any $3^{rd}$ party or internal databases used to gather signal data for a given area can be updated with the gather signal data from the smart collar. Similar to other embodiments, a geofence can be created around the desired area for implementing the extended battery plan. The geofence instructions can likewise be uploaded to the smart collar and be associated with the desired area, such that when a determination is made that the animal bearing the smart collar has left the geofence area that stimulus or communication device is activated, as noted above.

Figure 12:
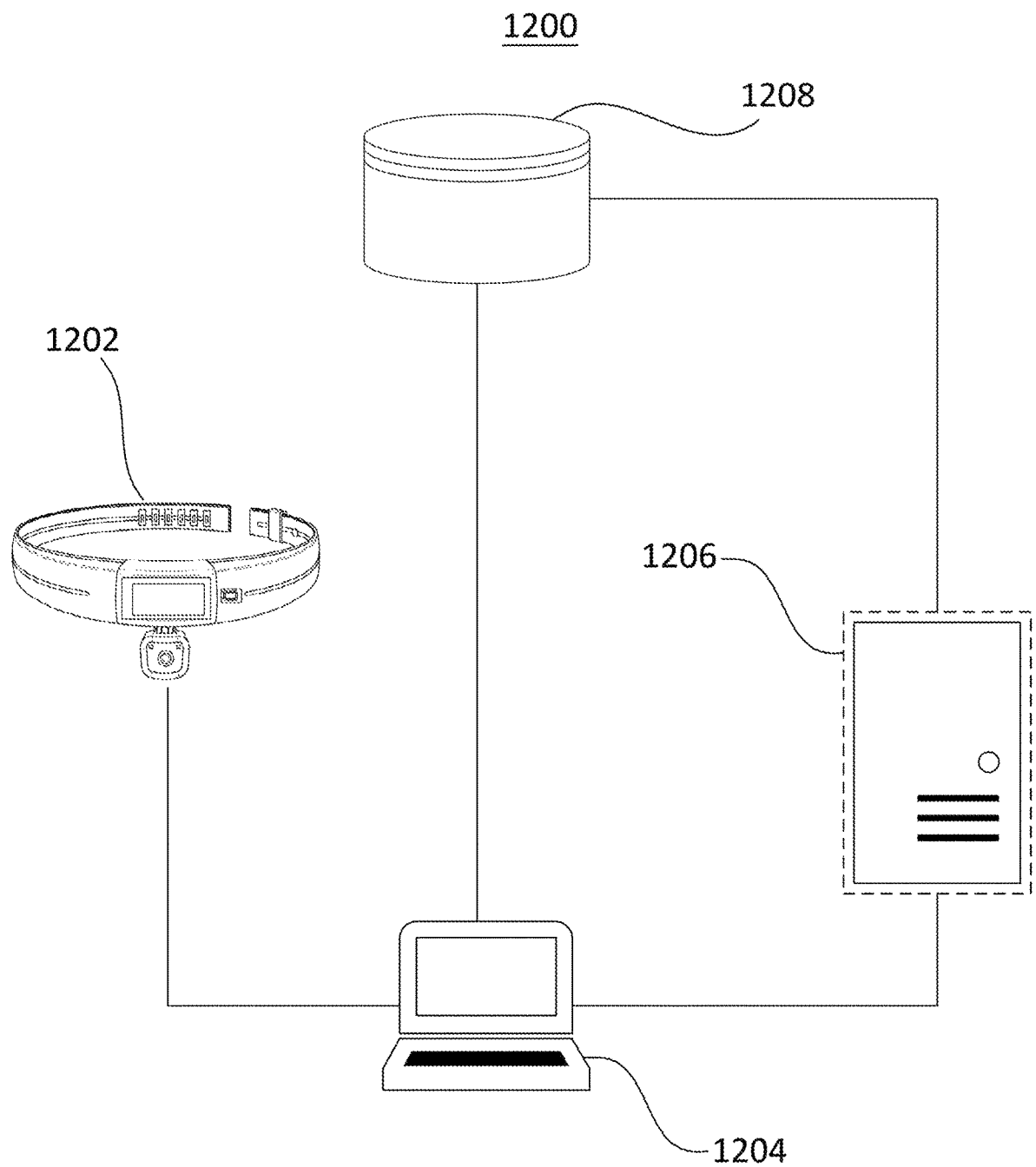
FIG. 12 illustrates a system schematic of a smart collar, networked computing device and remote database.

FIG. 12 illustrates system schematic 1200 of a smart collar 1202 that is configured to communicate (wired or wirelessly) with a networked computing device 1204, which can be a smartphone, laptop computer, and so forth. The networked computing device is configured to communicate via a network to a remote server 1206 and a remote database 1208. The remote server can be used to supplement or perform any comparisons of data and generate extended battery plans for uploading to the smart collar. The database can be an internal database, remote database or $3^{rd}$ party database(s) which has data signal information for a given area for GPS, Cellular and/or public WIFI hotspots.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A method for creating a geofence and extending battery life of a smart collar, wherein the smart collar comprises at least one processor unit, a global positioning system (GPS) unit, a WIFI unit, cellular chips including at least one of a GSM or a CDMA standard chip, and a memory, the method comprising:
   creating a geofenced area larger than the user's residence;
   determining based on the created geofenced area, a listing of available public hotspots, cellular strength regions, and global positioning system (GPS) regions for the geofenced area;
   generating a communications plan based on a given position for an animal wearing the smart collar residing in the geofenced area; and
   uploading at least a portion of the communication plan to the smart collar's memory.

2. The method of claim 1, further comprising the step of:
   modifying the communications plan on a remote server based on the current direction the animal wearing the animal collar is heading.

3. The method of claim 1, wherein the communications plan involves switching between operating in a Cellular or GPS communication mode to operating in a public hotspot mode.

4. The method of claim 1, wherein creating a geofenced area comprises determining a most efficient technique for tracking the smart collar based on a geographic region where the smart collar is currently located.

5. The method of claim 4, wherein the most efficient technique for tracking the smart collar is based on an amount of energy consumed by the smart collar.

6. A method for creating a geofence and extending battery life of a smart collar, wherein the smart collar comprises at least one processor unit, a global positioning system (GPS) unit, a WIFI unit, cellular chips including at least one of a GSM or a CDMA standard chip, and a memory, the method comprising:
- placing a device in a first region and determining a presence and strength of GPS signals, cellular signals, and public WIFI signals,
- storing which signals are present and a strength for each signal;
- determining which type of communication is most efficient for a smart collar;
- and saving a communication plan for the first region.

7. The method of claim 6, further comprising:
- placing a device in a second region and determining a presence and strength of GPS signals, cellular signals, and public WIFI signals,
- storing which signals are present and a strength for each signal;
- determining which type of communication is most efficient for a smart collar;
- and saving a communication plan for the second region.

8. A system for creating a geofence and extending battery life of a smart collar, wherein the smart collar comprises at least one processor unit, a global positioning system (GPS) unit, a WIFI unit, cellular chips including at least one of a GSM or a CDMA standard chip, and a memory, the method comprising:
- a device configured to determine a location and a presence and strength of GPS signals, cellular signals, and public WIFI signals at the location;
- a processor configured to determine which type of communication is most efficient for a smart collar at the location; and
- a memory device configured to store which type of communication is most efficient for the smart collar at the location.

9. A method for extending battery life of a smart collar, wherein the smart collar comprises at least one processor unit, a global positioning system (GPS) unit, a WIFI unit, cellular chips including at least one of a GSM or a CDMA standard chip, and a memory, the method comprising:
using a networked computing device having a processor and memory to do the following steps:
- identifying an area for desired use of the smart collar,
- gathering GPS signal data for the area from a remote database,
- gathering cellular signal data for the area from a remote database,
- gathering public WIFI signal data for the area from a remote database, and
- generating an extended battery plan for uploading to a smart collar, using the smart collar to perform the following steps:
  - determining a presence and strength of GPS signals, cellular signals, and public WIFI signals in the identified area based on the uploaded extended battery plan;
  - recording signal strength data of GPS signals, cellular signals, and public WIFI signals in the identified area;
- sending the recorded signal strength data to a memory accessible by the networked computing device;
- comparing using the networked computing device the recorded signal strength data to the signal data from the remote database for GPS signal data, cellular signal data and public WIFI signal data;
- updating the extended battery plan based on the compared signal information; and
- uploading the updated extended battery plan to the smart collar.

10. The method for extending battery life of a smart collar of claim 9, further comprising the step of updating the remote database with the recorded GPS signal data, cellular signal data, and public WIFI signal data.

11. The method for extending battery life of a smart collar of claim 9, further comprising the step of creating a geofence around at least a portion of the identified area.

12. The method for extending battery life of a smart collar of claim 11, further comprising the step of uploading the geofence to the smart collar.

13. The method for extending battery life of a smart collar of claim 12, wherein the smart collar is configured to notify a user associated with the smart collar when the smart collar has gone outside the geofence area.

14. The method for extending battery life of a smart collar of claim 12, wherein the smart collar is configured to cause a stimulus device on the smart collar to be activated.

* * * * *